(12) United States Patent
Lee

(10) Patent No.: US 12,465,782 B2
(45) Date of Patent: Nov. 11, 2025

(54) TRANSCRANIAL MAGNETIC STIMULATION APPARATUS AND CONTROL METHOD THEREOF

(71) Applicant: UNIVERSITY INDUSTRY FOUNDATION, YONSEI UNIVERSITY WONJU CAMPUS, Wonju-si (KR)

(72) Inventor: Yong Heum Lee, Wonju-si (KR)

(73) Assignee: UNIVERSITY INDUSTRY FOUNDATION, YONSEI UNIVERSITY WONJU CAMPUS, Wonju-si (KR)

(*) Notice: Subject to any disclaimer, the term of this patent is extended or adjusted under 35 U.S.C. 154(b) by 1010 days.

(21) Appl. No.: 17/616,482

(22) PCT Filed: Apr. 10, 2020

(86) PCT No.: PCT/KR2020/004923
§ 371 (c)(1),
(2) Date: Dec. 3, 2021

(87) PCT Pub. No.: WO2020/246701
PCT Pub. Date: Dec. 10, 2020

(65) Prior Publication Data
US 2022/0241604 A1    Aug. 4, 2022

(30) Foreign Application Priority Data
Jun. 4, 2019    (KR) ........................ 10-2019-0066156

(51) Int. Cl.
*A61N 2/00*    (2006.01)
*A61N 2/02*    (2006.01)

(52) U.S. Cl.
CPC ............... *A61N 2/006* (2013.01); *A61N 2/02* (2013.01)

(58) Field of Classification Search
CPC .................................. A61N 2/006; A61N 2/02
See application file for complete search history.

(56) References Cited

U.S. PATENT DOCUMENTS

2010/0210894 A1* 8/2010 Pascual-Leone .... A61B 5/4094
600/14

FOREIGN PATENT DOCUMENTS

| KR | 20090063618 | 6/2009 |
|----|-------------|--------|
| KR | 20140137132 | 12/2014 |
| KR | 101511444 | 4/2015 |
| KR | 20160095579 | 8/2016 |

(Continued)

OTHER PUBLICATIONS

International Search Report—PCT/KR2020/004923 dated Nov. 19, 2020.

*Primary Examiner* — Carrie R Dorna
*Assistant Examiner* — Joshua Daryl D Lannu
(74) *Attorney, Agent, or Firm* — CANTOR COLBURN LLP

(57) ABSTRACT

Provided is a transcranial magnetic stimulation apparatus and the transcranial magnetic stimulation apparatus includes a housing unit provided to be wearable on a head of a user; a magnetic field generator which is provided in the housing unit and irradiates a magnetic field toward a target portion which is a target to be irradiated with a magnetic field, of a brain area corresponding to the head of the user; and a controller which controls an operation of the magnetic field generator.

9 Claims, 18 Drawing Sheets

(56) References Cited

FOREIGN PATENT DOCUMENTS

KR        101718129     3/2017
KR     20180089683     8/2018

\* cited by examiner (a)

(b)

(c)

(d)

(a)

(b)

MAGNETIC STIMULATION MODE

N pulse STIMULATION

S pulse STIMULATION

N/S STIMULATION

N CONTINUOUS STIMULATION

S CONTINUOUS STIMULATION

FIG. 19

| FREQUENCY | STATE OF BRAIN |
|---|---|
| DELTA (1~4Hz) | DEEP SLEEP STATE |
| THETA (4~8Hz) | SLEEPY, DELUSIONAL, DISTRACTED, DAYDREAMING STATES |
| ALPHA (8~12Hz) | LOOSE CONCENTRATION, DAZED MENTAL STATE |
| SMR (12~15Hz) | STATE OF MAINTAINING CONCENTRATION DURING STATE OF IMMOBILITY |
| BETA (12~15Hz) | STATE OF MAINTAINING CONCENTRATION DURING ACTIVE STATE |
| HIGH BETA (18~30Hz) | UNCOMFORTABLE STATE, ANXIETY, STRESS |
| GAMMA (30Hz or higher) | EXCITEMENT, ANXIETY, MOMENTARY AWARE |

FIG. 20

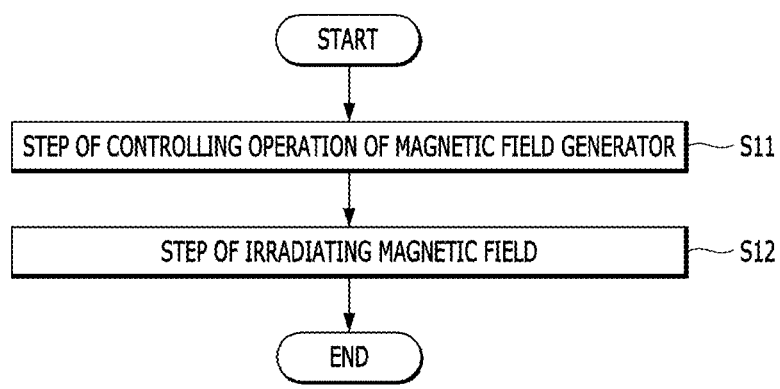

TRANSCRANIAL MAGNETIC STIMULATION APPARATUS AND CONTROL METHOD THEREOF

BACKGROUND

Field

The present disclosure relates to a transcranial magnetic stimulation apparatus and a control method thereof.

Description of the Related Art

FIG. 1 is a view illustrating an example of a transcranial magnetic field apparatus of the related art which is capable of performing a transcranial magnetic stimulation. FIGS. 2 and 3 are views for explaining a principle of transcranial magnetic stimulation.

Referring to FIGS. 1 to 3, the transcranial magnetic stimulation (TMS) refers to one method of nonoperative brain stimulation which stimulates a specific part of the brain with a magnetic field generated by a conductive electromagnetic coil to activate nerve cells.

The principle of the transcranial magnetic stimulation (TMS) is as follows. When a strong current $1a$ is applied to a coil to generate a magnetic field, change in a strong magnetic field $1b$ which is generated to pass through a coil disposed on the head may induce a bio current $1c$ in the cerebral cortex. Such transcranial magnetic stimulation stimulates nerve cells in the brain tissue using the induced currents.

In other words, according to the transcranial magnetic stimulation, when a strong magnetic field is generated with a conductive electromagnetic coil near the head, the magnetic field passes through the skull to stimulate nerve cells in the transcranial cortex. At this time, depending on the speed of the magnetic field, the activity of the cerebral cortex may be increased or decreased. For example, when the activity of the cerebral cortex is low, such as depression, high frequency stimulation is used and when the activity is too high, such as anxiety or mania, the low frequency stimulation is used to adjust the activity. The transcranial magnetic stimulation has been mainly used for the treatment of depression and in addition, also used for treatment of patients with various psycho-neurological diseases.

All nerves in the human body deliver necessary nerve substances through electricity. Human movement, thinking, and feeling are all performed by interaction and control of the neurotransmitters in the brain. Specifically, in order to move the neurotransmitters from one neuron to another neuron, a potential having a required intensity is necessary.

When there is no external interference, the membrane maintains electrical polarization. At this time, the inside of the cell membrane has a negative potential compared to the outside, which is referred to as a stable potential which is mostly approximately 70 mV. When the neuron is stimulated, the neurotransmitter may be delivered by a potential difference and a potential with a predetermined intensity is required therefor. When an intensity of the potential is a normal level, the neurotransmitter moves from one neuron to another neuron, but when an intensity of the potential is low, the neurotransmitters do not move between neurons.

The consistent stimulation of the transcranial magnetic stimulation (TMS)) increases the intensity of the potential to deliver the neurotransmitters to another neuron.

For example, the previous research related to the improvement of the brain disease provided by Boston University with regard to the transcranial stimulation will be described as follows.

A research team led by Professor of Neuroscience, Robert Reinhardt, of Boston University conducted an experiment related to the improvement of the brain disease on 42 old people (60 to 76 years old) and 42 young people (20 to 29 years old).

During the experiment, an electroencephalogram (EEG) cap attached with a transcranial alternative current stimulation (tACS) device was worn on a head of a subject and a very weak current was flown for 50 minutes to conduct a working memory test through a computer screen. During the experiment, they observed how the flow of the brainwave of the frontal lobe and the left temporal lobe which were brain areas related to the working memory was changed with the specific electroencephalography.

According to the experiment result, it was discovered that when a very weak current was applied to the brain (when the brain was stimulated with a weak current), the working memory which gradually declined with age, was recovered to the level of a young person in their twenties.

According to this, the transcranial stimulation may be easily utilized to improve the cognitive decline such as dementia.

However, most of the transcranial magnetic field apparatuses which are known for the transcranial magnetic stimulation in the related art use high power/high magnetic field and are large and heavy. Further, the transcranial magnetic field apparatuses of the related art have problems in that cooling is necessary due to significant heat generation, stimulation on a local part and stimulation with a low frequency are not easy, and multiple channels are not provided (that is, only a single channel is possible).

In other words, the transcranial magnetic field apparatuses of the related art require a power unit for high power for generation of magnetic fields so that there is a problem in that a size and a weight of the apparatus are increased and a cooling system (unit) is required due to severe heat generated in the system. Further, the transcranial magnetic field apparatuses of the related art apply a high voltage/high current to heat the coil and generate a high magnetic field (for example, 2T, 20000 Gauss or higher), but does not perform the low frequency stimulation. Furthermore, the transcranial magnetic field apparatuses of the related art have a problem in that it is difficult to locally stimulate on a specific part of the brain area of the subject (user).

A related art of the present disclosure is disclosed in Korean Unexamined Patent Application Publication No. 10-2016-0095579.

SUMMARY

An object of the present disclosure is to solve the problems of the related art and to provide a transcranial magnetic stimulation apparatus and a control method thereof which solve the problems of the transcranial magnetic field apparatus of the related art in that a power unit for a high power is necessary to generate a magnetic field so that the size and the weight of the apparatus are increased and the cooling system (unit) is necessary due to the severe heat generated in the system.

An object of the present disclosure is to solve the problems of the related art and to provide a transcranial magnetic stimulation apparatus and a control method thereof which solve the problems of the transcranial magnetic field apparatus of the related art in that a high voltage/high current is applied to heat the coil, and a high magnetic field (for example, 2T, 20000 Gauss or higher) is generated, but low frequency stimulation cannot be performed.

An object of the present disclosure is to solve the problems of the related art and to provide a transcranial magnetic stimulation apparatus and a control method thereof which solve the problems of the transcranial magnetic field apparatus of the related art in that it is difficult to locally stimulate on a specific part of the brain area of the subject (user).

However, objects to be achieved by various embodiments of the present disclosure are not limited to the technical objects as described above and other technical objects may be present.

As a technical means to achieve the above-described technical objects, according to a first aspect of the present disclosure, a transcranial magnetic stimulation apparatus may include a housing unit provided to be wearable on a head of a user; a magnetic field generator which is provided in the housing unit and irradiates a magnetic field toward a target portion which is a target to be irradiated with a magnetic field, of a brain area corresponding to the head of the user; and a controller which controls an operation of the magnetic field generator.

As a technical means to achieve the above-described technical object, according to a second aspect of the present disclosure, a control method of a transcranial magnetic stimulation apparatus may include a step of controlling an operation of a magnetic field generator provided in a housing unit provided to be wearable on a head of the user; and a step of irradiating a magnetic field toward a target portion which is a target to be irradiated with a magnetic field, of a brain area corresponding to the head of the user, in accordance with the control.

As a technical means to achieve the above-described technical object, according to a third aspect of the present disclosure, a computer program may be stored in a recording medium to execute the control method of a transcranial magnetic stimulation apparatus according to the second aspect of the present disclosure.

The above-described solving means are merely illustrative but should not be construed as limiting the present disclosure. In addition to the above-described embodiments, additional embodiments may be further provided in the drawings and the detailed description of the present disclosure.

According to the present disclosure, a transcranial magnetic stimulation apparatus which does not require a power unit for a high power, has a small size and a light weight, and minimizes the heat generated in the system and a control method thereof may be provided.

According to the present disclosure, a transcranial magnetic stimulation apparatus which minimizes the heat generation, generates a weak magnetic field, and performs stimulation with a low frequency of 1 Hz to 1 kHz and a control method thereof may be provided.

According to the present disclosure, at least one magnetic field generator provided to surround a head of a user is selectively controlled to selectively stimulate locally on a specific part of the brain area of the subject (user) and on the entire brain area.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which:

FIG. 19 is a view for explaining a brain state according to a type of a brainwave measured by a transcranial magnetic stimulation apparatus according to another exemplary embodiment of the present disclosure; and FIG. 20 is a flowchart of an operation of a control method of a transcranial magnetic stimulation apparatus according to an exemplary embodiment of the present disclosure.

DETAILED DESCRIPTION OF THE EMBODIMENT

Figure 1:
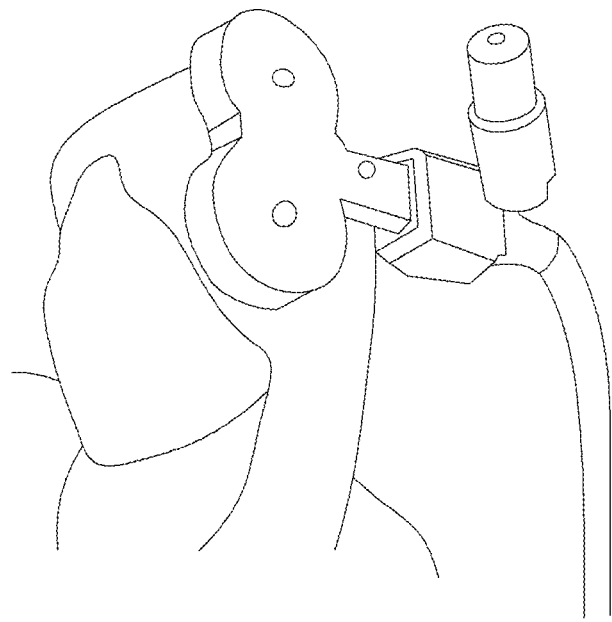
FIG. 1 is a view illustrating an example of a transcranial magnetic field apparatus of the related art which is capable of performing a transcranial magnetic stimulation.
Figure 2:
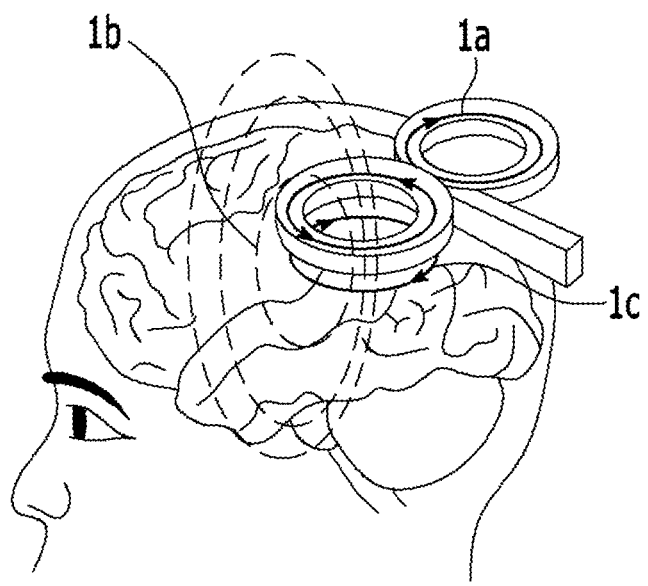
FIGS. 2 and 3 are views for explaining a principle of transcranial magnetic stimulation.
Figure 3:
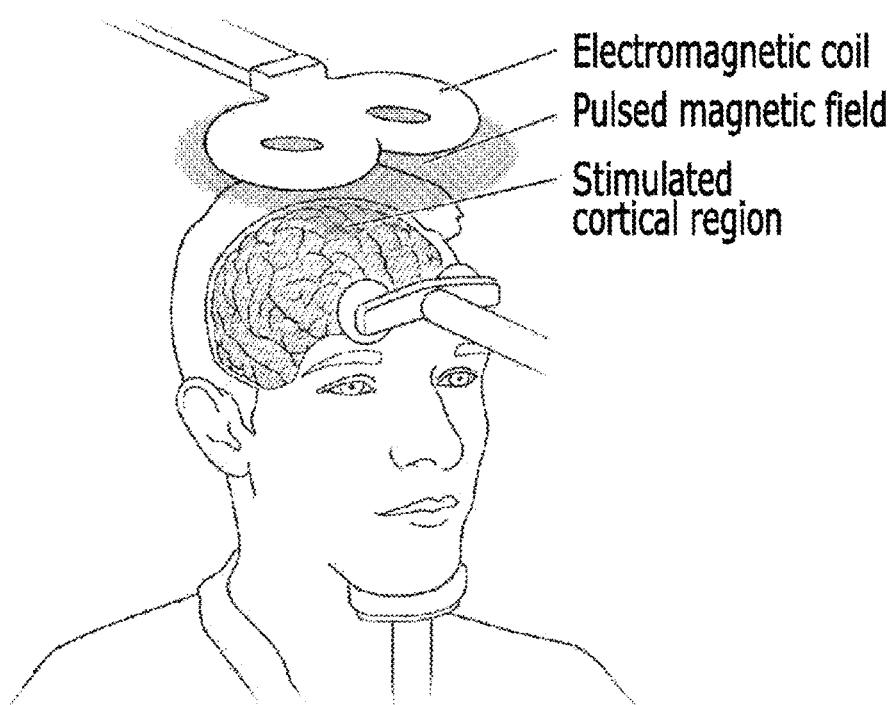

Hereinafter, the present disclosure will be described more fully with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element "electrically or coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

Figure 4:
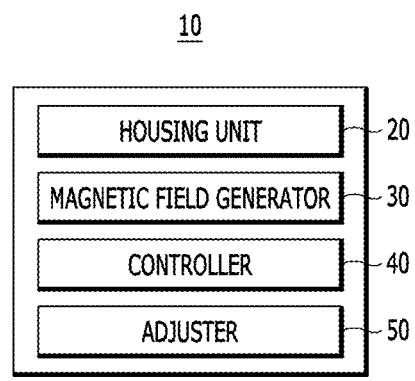
FIG. 4 is a block diagram illustrating a schematic configuration of a transcranial magnetic stimulation apparatus according to an exemplary embodiment of the present disclosure.
Figure 5:
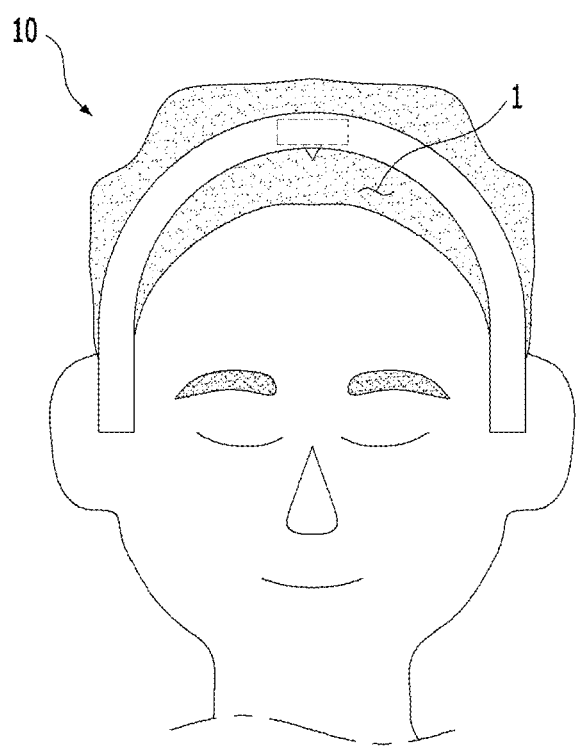
FIG. 5 is a view schematically illustrating an example that a transcranial magnetic stimulation apparatus according to an exemplary embodiment of the present disclosure is worn on a head of a user.
Figure 6:
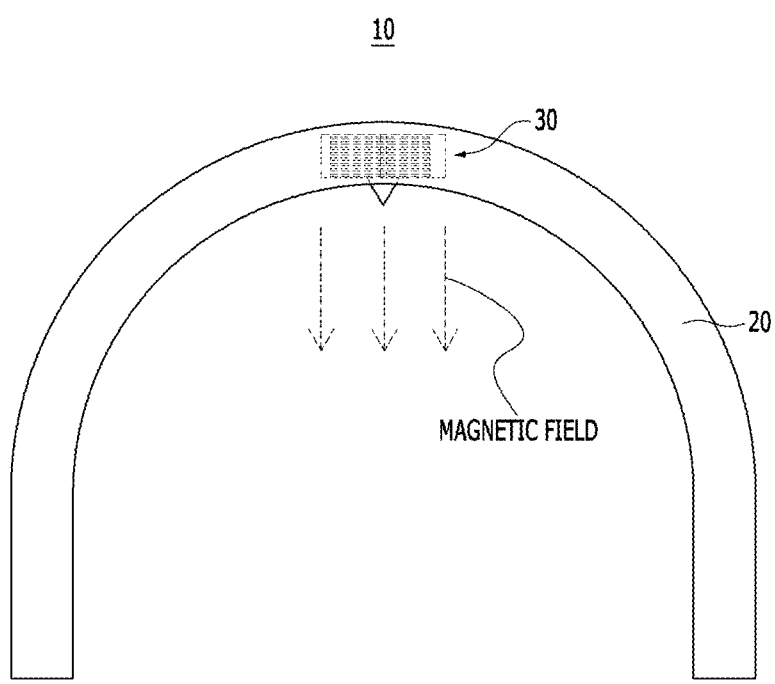
FIG. 6 is a view schematically illustrating a transcranial magnetic stimulation apparatus according to an exemplary embodiment of the present disclosure.

FIG. 4 is a block diagram illustrating a schematic configuration of a transcranial magnetic stimulation apparatus 10 according to an exemplary embodiment of the present disclosure. FIG. 5 is a view schematically illustrating an example that a transcranial magnetic stimulation apparatus 10 according to an exemplary embodiment of the present disclosure is worn on a head 1 of a user. FIG. 6 is a view schematically illustrating a transcranial magnetic stimulation apparatus 10 according to an exemplary embodiment of the present disclosure.

Hereinafter, a transcranial magnetic stimulation apparatus 10 according to an exemplary embodiment of the present disclosure will be simply referred to as the present apparatus 10 for the convenience of description.

Referring to FIGS. 4 to 6, the present apparatus 10 may include a housing unit 20, a magnetic field generator 30, a controller 40, and an adjuster 50.

The housing unit 20 may be provided to be wearable on a head 1 of the user. The housing unit 20 may also be referred to as a head wearing unit.

The housing unit 20 may include any one of a band portion having a material which is extendable or contractible to surround the head 1 of the user, an elastic portion which is fixed to surround at least a part of the circumference of the head 1 of the user, and a helmet portion which is wearable to surround the entire head 1 (or at least a part of the head) of the user. That is, the housing unit 20 may be formed of at least one of a band type, a headband type, and a helmet type, but is not limited thereto so that the housing unit may be provided (manufactured or designed) to have various types (for example, a holder type) which are wearable on the head.

For example, the housing unit 20 may be formed of a material such as plastic or fiber glass, but is not limited thereto. Further, the housing unit 20 may be formed of a material used to manufacture a headband or a band in the related art, but is not limited thereto.

Figure 7:
FIG. 7 is a view illustrating an example of a housing unit of a transcranial magnetic stimulation apparatus according to an exemplary embodiment of the present disclosure.
Figure 7:
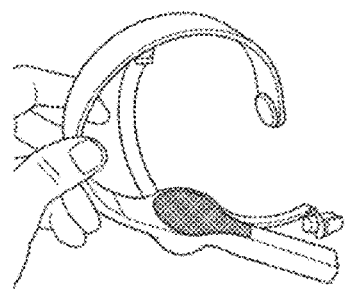
Figure 7:
Figure 7:
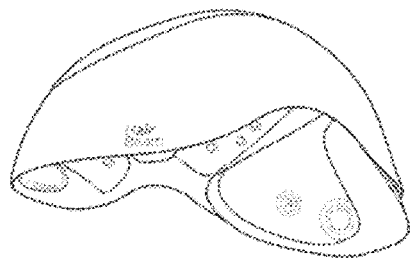

FIG. 7 is a view schematically illustrating an example of a housing unit 20 of a transcranial magnetic stimulation apparatus 10 according to an exemplary embodiment of the present disclosure.

Referring to FIG. 7, in the present apparatus 10, the housing unit 20 may be formed as a band (headband) to surround at least a part of the head 1 of the user, as illustrated in FIGS. 7A, 7B, and 7C. As another example, the housing unit 20 may be formed as a helmet as illustrated in FIG. 7D.

When the housing unit 20 is provided as a band type as an example, the present apparatus 10 may also be referred to as a bare head type present apparatus 10. When the housing unit 20 is provided as a helmet type as another example, the present apparatus 10 may also be referred to as a helmet type present apparatus 10.

The magnetic field generator 30 may be provided in the housing unit 20. The magnetic field generator 30 may be provided such that at least a part is embedded in the housing unit 20. In other words, the magnetic field generator 30 may be provided such that at least a part is exposed from an inner surface of the housing unit 20. At this time, the part of the magnetic field generator 30 which is exposed from the inner surface of the housing unit 20 may refer to a sharp portion 33a included in the magnetic field generator 30 to be described below. The description of the configuration of the magnetic field generator 30 may be more easily understood with reference to FIG. 8.

Figure 8:
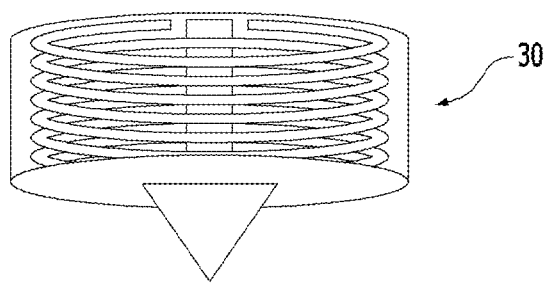
FIG. 8 is a view schematically illustrating a configuration of a magnetic field generator of a transcranial magnetic stimulation apparatus according to an exemplary embodiment of the present disclosure.
Figure 8:
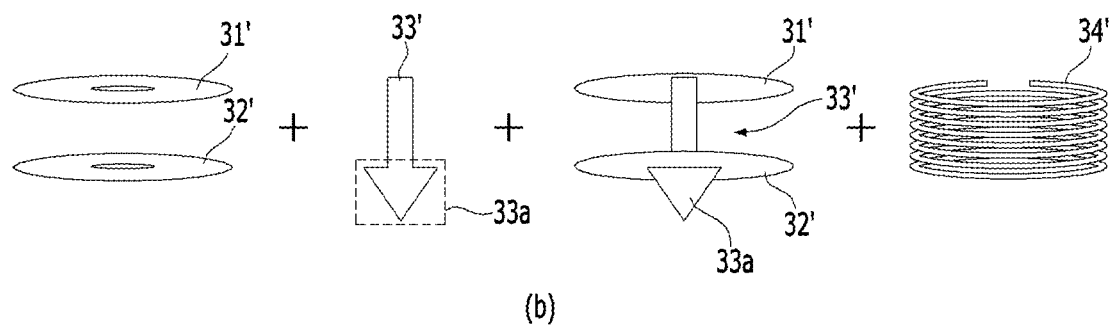

FIG. 8 is a view schematically illustrating a configuration of a magnetic generator field 30 of a transcranial magnetic stimulation apparatus 10 according to an exemplary embodiment of the present disclosure. Specifically, FIG. 8A illustrates an entirely assembled view of the magnetic field generator 30 and FIG. 8B illustrates an exploded view of the magnetic field generator 30.

Referring to FIG. 8, the magnetic field generator 30 may include two coil guides 31' and 32', a magnetic body 33', and a coil 34'.

Two coil guides 31' and 32' may be located to be opposite each other. For example, two coil guides 31' and 32' may be a plastic material. That is, two coil guides 31' and 32' may be plastic coil guides.

The magnetic body 33' may be disposed between two coil guides to be perpendicular to two coil guides 31' and 32'. The magnetic body 33' may be inserted in a center hole of two coil guides 31' and 32'. The magnetic body 33' may be a ferromagnetic material having a strong magnetizing force, and for example, may be ferrite. The magnetic body 33' may include a sharp portion 33a at one end to apply acupressure to the head 1 of the user corresponding to a target portion on which the magnetic field is irradiated.

The sharp portion 33a may be formed to protrude from an outer surface of any one coil guide between two coil guides 31' and 32'. For example, the sharp portion 33a may have a triangular shape, but is not limited thereto so that various shapes (a core structure) which are capable of applying the acupressure and focusing the magnetic field, such a spherical shape, may be allowed. The sharp portion 33a may be a ferromagnetic material which is the same as the magnetic body 33'. The magnetic body 33' including the sharp portion 33a may also be referred to as a thumbtack type magnetic body.

At least a part of the sharp portion 33a may be provided in the housing unit 20 to be exposed from the inner surface of the housing unit 20. When the user wears the present apparatus 10 on the head, the sharp portion 33a may be located in a partial portion (a partial area) of the head 1 of the user corresponding to a brain area to be stimulated with the magnetic field, of the entire head 1 (entire area) of the user. Here, the magnetic field stimulation may refer to stimulation by a magnetic field generated from the magnetic field generator 30.

The coil 34' may be provided to be wound around the magnetic body 33'. The number of windings of the coil 34' around the magnetic body 33' may be set to be various.

The remaining configurations (for example, two coil guides, the magnetic body excluding the sharp portion, and the coil) of the magnetic field generator 30 other than the sharp portion 33a may be provided to be embedded in the housing unit 20.

The magnetic field generator 30 may irradiate a magnetic field toward a target portion to be irradiated with the magnetic field, of the brain area corresponding to the head 1 of the user. The magnetic field generator 30 may irradiate a magnetic field toward a target portion of the brain area corresponding to a transcranial region of the head 1 of the user.

According to this, the target portion may refer to at least a part of the brain area (the entire brain area) of the head 1 of the user. That is, the target portion may refer to at least a part of the entire brain area. The description of the brain area may be more easily understood with reference to FIGS. 9A and 9B.

Figure 9A:
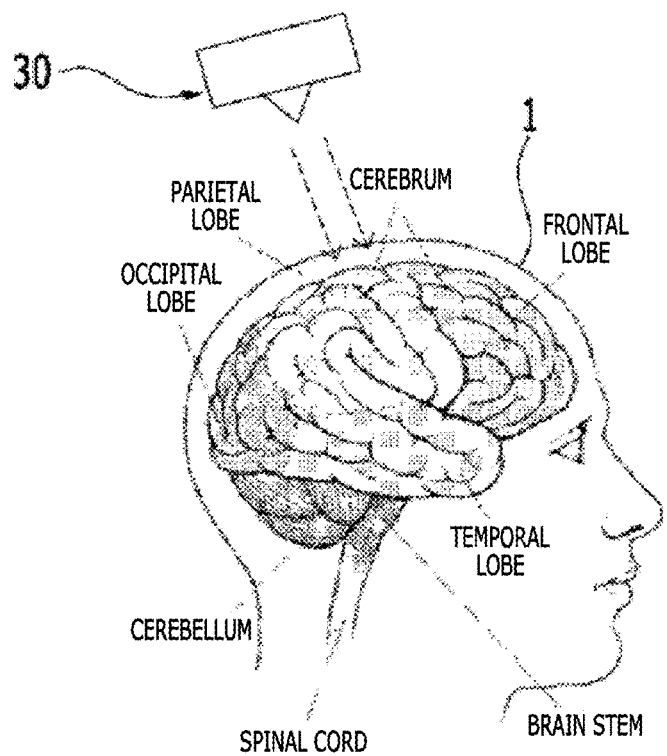
FIGS. 9A and 9B are views for explaining a brain area on which a magnetic field can be irradiated by a magnetic field generator of a transcranial magnetic stimulation apparatus according to an exemplary embodiment of the present disclosure.
Figure 9B:
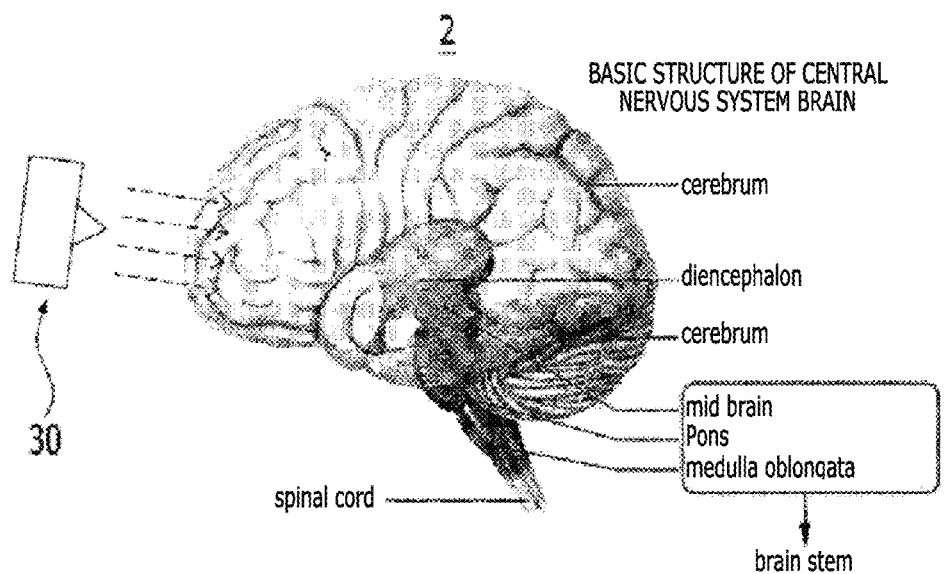

FIGS. 9A and 9B are views for explaining a brain area 2 on which a magnetic field can be irradiated (stimulated with a magnetic field) by a magnetic field generator 30 of a transcranial magnetic stimulation apparatus 10 according to an exemplary embodiment of the present disclosure.

Referring to FIGS. 9A and 9B, the magnetic field generator 30 may irradiate the magnetic field toward the target portion with at least a part of the brain area 2 (that is, a brain part of the user's head) corresponding to the head 1 of the user as a target portion on which the magnetic field is irradiated.

The brain area 2 includes the frontal lobe, the occipital lobe, the temporal lobe, the brainstem, and the cerebellar. Here, the brainstem may include the midbrain, the pons, and the medulla oblongata. In other words, the target portion may be at least one (that is, any one area or two or more areas) of the frontal lobe, the occipital lobe, the temporal lobe, the brainstem, and the cerebellar. However, examples of the brain area 2 are just an example for helping the understanding of the present disclosure so that various areas which configure the brain may be included without being limited thereto.

Further, the magnetic field generator 30 may irradiate (emit) the magnetic field by the control of the controller 40. The magnetic field generator 30 may irradiate (generate) a pulsed electro-magnetic field (PEMF) as a magnetic field. In other words, the magnetic field irradiated by the magnetic field generator 30 may be a pulsed electro-magnetic field (PEMF).

Further, the magnetic field generator 30 may irradiate a magnetic field having a magnetic field intensity of 1000 Gauss or lower (that is, 100 mT or lower) as a weak magnetic field. The controller 40 may adjust the intensity of the magnetic field generated from the magnetic field generator 30 to have various values in the range of 100 mT or lower. The controller 40 adjusts the intensity of the magnetic field within the range of 100 mT or lower to adjust the strength (intensity) of the magnetic field stimulation on the target portion.

Further, the magnetic field generator 30 may provide various types of magnetic field stimulation. The magnetic field generator 30 may perform pulsed magnetic field stimulation (that is, magnetic field pulse stimulation) as the magnetic field stimulation. At this time, the magnetic field generator 30 may provide the magnetic field stimulation by applying the PWM method to desirably generate an eddy current of a human body and minimize the heat generation.

Further, the magnetic field generator 30 may generate a frequency within a frequency range of 1 Hz to 1 kHz. That is, the magnetic field generator 30 may irradiate a magnetic field having any one frequency among frequencies of 1 Hz to 1 kHz. Specifically, the magnetic field generator 30 may irradiate a magnetic field having a frequency less than 30 Hz to activate the cranial nerves (to activate the brainwave). Further, the magnetic field generator 30 may irradiate a magnetic field having a frequency of 30 Hz or higher or 1 kHz or lower to improve cerebrovascular blood vessel and cerebral blood flow.

The operation of the magnetic field generator 30 may be controlled by the controller 40. The magnetic field stimulation on the target portion may be performed by the magnetic field irradiated onto the target portion of the brain area 2 from the magnetic field generator 30.

The controller 40 may control the operation of the magnetic field generator 30. The controller 40 may control a type of the magnetic field generated from the magnetic field generator 30 to vary according to a type of a target portion (a target portion to be irradiated with the magnetic field) on which the magnetic field is irradiated, of the brain area corresponding to the head 1 of the user.

Here, the type of the target portion may include at least one of a name, a size, and a position of the target portion. That is, the type of the target portion may include at least one of a name, a size and a position of the brain (that is, the brain which is a target portion on which the magnetic field is irradiated) on which the magnetic field is irradiated from the magnetic field generator 30.

In other words, the controller 40 may control to vary the type of the magnetic field generated from the magnetic field generator 30, in consideration of at least one of the name, the size, and the position of the brain (a target portion) on which the magnetic field is irradiated. Here, the name may refer to a name of the brain area such as the frontal lobe, the occipital lobe, the temporal lobe, the brainstem, and the cerebellum.

Further, a type of the magnetic field generated from the magnetic field generator 30 may include at least one of an intensity, a frequency, a time, a pattern, and a magnetic field pulse stimulation mode of a magnetic field. In other words, the controller 40 may control at least one of an intensity, a frequency, a time, a pattern, and a magnetic field pulse stimulation mode of a magnetic field as a type of magnetic field generated from the magnetic field generator 30. Further, a type of the magnetic field may include, for example, at least one of a sinewave, a square wave (a monophasic type or a biphasic type), and a pulsed wave.

Figure 10:
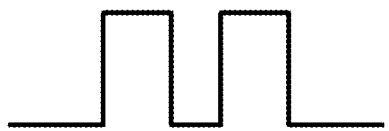
FIG. 10 is a view for explaining a magnetic field pulse stimulation mode among types of magnetic fields generated from a magnetic field generator of a transcranial magnetic stimulation apparatus according to an exemplary embodiment of the present disclosure.
Figure 10:
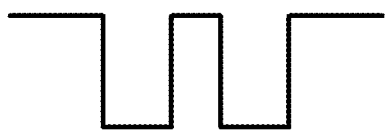
Figure 10:
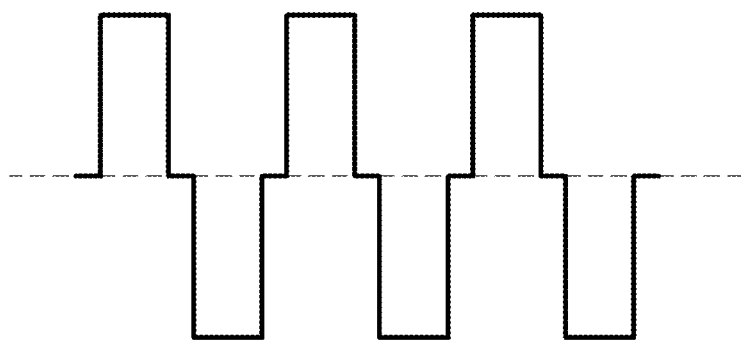
Figure 10:
Figure 10:

The description of the magnetic field pulse stimulation mode may be more easily understood with reference to FIG. 10.

FIG. 10 is a view for explaining a magnetic field pulse stimulation mode among types of magnetic fields generated from a magnetic field generator 30 of a transcranial magnetic stimulation apparatus 10 according to an exemplary embodiment of the present disclosure.

Referring to FIG. 10, the controller 40 may control an operation of the magnetic field generator 50 to generate a magnetic field pulse stimulation corresponding to a type of the magnetic field pulse stimulation mode (a magnetic field stimulation mode). That is, the controller 40 may control the magnetic field pulse stimulation mode as an example of a type of the magnetic field generated from the magnetic field generator 30. The magnetic field generator 30 may generate (provide) the magnetic field pulse stimulation by controlling the magnetic field pulse stimulation mode.

The magnetic field pulse stimulation mode (magnetic field pulse stimulation mode information) may include an N-pulse stimulation mode, an S pulse stimulation mode, an alternative stimulation mode of N pulse and S pulse (N/S stimulation mode), an N pulse continuous stimulation mode, and an S pulse continuous stimulation mode. According to this, the magnetic field generator 30 may generate any one magnetic field pulse stimulation among the N-pulse stimulation mode, the S pulse stimulation mode, the alternative stimulation mode of N pulse and S pulse, the N pulse continuous stimulation mode, and the S pulse continuous stimulation mode, by the control of the magnetic field pulse stimulation mode by the controller 40.

The controller 40 may control to vary the type of the magnetic field (at least one of the intensity, the frequency, the time, the pattern of the magnetic field, and the magnetic field pulse stimulation mode) generated from the magnetic field generator 30, according to a type of the target portion (for example, a name, a size, and a position of the target portion).

Here, the information about the name, among the types of the target portion which are considered to control to vary the type of the magnetic field may be input, for example, by the user.

For example, the present apparatus 10 may include an input unit (not illustrated). The input unit (not illustrated) may be provided on an area of an outer surface of the housing unit 20. The user may input a name to perform the magnetic field stimulation by means of the input unit (not illustrated). That is, the present apparatus 10 may receive information about the name of the brain (target portion) to be irradiated with the magnetic field, from the user, by means of the input unit (not illustrated). For example, the input unit (not illustrated) may be implemented by touch input by means of a display unit or button input by means of a physical button.

As another example, the present apparatus 10 may be connected to a user terminal (not illustrated) via network communication. The user may input the name corresponding to the target portion by means of the user terminal (not illustrated). The present apparatus 10 may acquire (receive) information about the name which is input to the user terminal (not illustrated) by the user, from the user terminal (not illustrated) via the network communication.

That is, the present apparatus 10 may receive the information about the name input by the user from the input unit (not illustrated) equipped in the housing unit 20 of the present apparatus 10 or remotely receive the information from the user terminal (not illustrated) which is connected to the present apparatus 10 via the network communication.

Examples of the network communication may include all kinds of wired/wireless networks such as a 3$^{rd}$ generation partnership project (3GPP) network, a long term evolution (LTE) network, a world interoperability for microwave access (WiMAX) network, Internet, a local area network (LAN), a wireless local area network (wireless LAN), a wide area network (WAN), a personal area network (PAN), a Bluetooth network, a near field communication (NFC) network, a satellite broadcasting network, an analog broadcasting network and a digital multimedia broadcasting (DMB) network, but are not limited thereto.

For example, the user terminal (not illustrated) may include all kinds of wired/wireless communication devices such as a personal communication system (PCS), a global system for mobile communication (GSM), a personal digital cellular (PDC), a personal handyphone system (PHS), a personal digital assistant (PDA), an international mobile communication (IMT)-2000, code division multiple access (CDMA)-2000, W-code division multiple access (W-CDMA), a wireless broadband internet (Wibro) terminal, a smart phone, a smart pad, a tablet PC, a notebook, a wearable device, and a desktop PC.

As described above, the controller 40 may control the type of the magnetic field generated from the magnetic field generator 30 to vary according to the information about the name input from the user (name information corresponding to the target portion), as a type of the target portion.

For example, as the information about the name, when information about "frontal lobe" is input, the controller 40 may control the type of magnetic field to a first type. For example, as the information about the name, when information about "temporal lobe" is input, the controller 40 may control the type of magnetic field to a second type.

Here, the first type may refer to a magnetic field having an intensity (strength) which is relatively stronger than the intensity (strength) of a second type of magnetic field. As another example, the first type may refer to a magnetic field having a frequency relatively higher than a frequency of a second type of magnetic field. As a specific example, when the type of the magnetic field is a first type, the controller 40 may control a frequency of the magnetic field to be, for example, 10 Hz and when the type of the magnetic field is a second type, the controller may control a frequency of the magnetic field to be, for example, 20 Hz.

As described above, the controller 40 recognizes a name of the target portion based on the user input and may vary the type of the magnetic field generated from the magnetic field generator 30 according to the recognized name of the target portion.

Further, the information about the size and/or the position of the target portion, among the types of the target portion which are considered to be controlled to vary the type of the magnetic field may be identified, for example, based on a three-dimensional image of the head 1 of the user.

To this end, the present apparatus 10 may include an analyzer (not illustrated) which identifies a size and/or a position of the target portion based on the input three-dimensional image of the head 1 of the user (that is, a three-dimensional image of the brain area of the head of the user).

The three-dimensional image may be generated based on an image obtained by photographing at least a part of the head 1 of the user. The three-dimensional image may be, for example, an image generated by three-dimensionally modeling the image of the head 1 of the user photographed by the MRI device or a CT device.

When the information about the name of the target portion is input from the user, the analyzer (not illustrated) may identify the size and/or the position of the target portion based on the three-dimensional image of the head 1 of the user.

At this time, the analyzer (not illustrated) may calculate an area of the target portion with regard to identification of the size of the target portion. Further, the analyzer (not illustrated) may calculate a distance (in other words, depth information) from a surface of the head 1 of the user (a scalp or a surface of the body) to a central position of the target portion, with regard to identification of the size of the target portion.

The controller 40 may control a type of the magnetic field generated from the magnetic field generator 30 to vary according to a size (that is, an area) of the target portion identified (calculated) by the analyzer (not illustrated).

For example, when the target portion is "frontal lobe" and a size of the identified target portion is equal to or higher than a first size threshold value, the controller 40 may control the type of the magnetic field to a first type. For example, when the size of the identified target portion is lower than a first size threshold value, the controller 40 may control the type of magnetic field to a second type. Here, examples of the first type and the second type have been described above, so that the description will be omitted below.

When the target "temporal lobe", the controller 40 may control the type of the magnetic field to vary depending on whether the size of the identified target portion is equal to or higher than a second size threshold value. For example, when the size of the "temporal lobe" is equal to or higher than the second size threshold value, the controller 40 may control the type of the magnetic field to a first type and when the size is lower than the second threshold value, the controller may control the type of the magnetic field to a second type.

Here, the first type may refer to a magnetic field having an intensity (strength) which is relatively stronger than the intensity (strength) of a second type of magnetic field. As a specific example, when the type of the magnetic field is a first type, the controller 40 may control an intensity (strength) of the magnetic field to be, for example, 800 Gauss and when the type of the magnetic field is a second type, the controller may control an intensity of the magnetic field to be, for example, 400 Gauss.

At this time, the size reference value (that is, a size threshold value, for example, the first size threshold value or the second size threshold value described above) of the target portion to be controlled to vary the type of the magnetic field may be set to be different for every name of the target portion.

The controller 40 may control a type of the magnetic field generated from the magnetic field generator 30 to vary according to a position of the target portion identified (calculated) by the analyzer (not illustrated) (that is, a distance from the surface (a surface of a body) of the user's head to the central position of the target portion, depth information).

For example, when the target portion is a "frontal lobe" and an identified position of the target portion (a distance from the body skin to the central position of the target portion) is equal to or larger than a first position threshold value (a first distance threshold value), the controller 40 may control the type of the magnetic field to a first type. In other words, when a distance from a surface of the head 1 of the user to the central position of the target portion is equal to or larger than the first position threshold value (a first distance threshold value), the controller 40 may control the type of the magnetic field to a first type. If the identified position of the target portion is lower than a first position threshold value, the controller 40 may control the type of magnetic field to a second type. Here, examples of the first type and the second type have been described above, so that the description will be omitted below.

At this time, the position reference value, that is, a position threshold value of the target portion (in other words, a distance threshold value, for example, the first position threshold value or the second position threshold value described above) to control to vary the type of the magnetic field may be set to be different for every name of the target portion.

Further, for example, the reference value of the size of the target portion may be set based on an average of the size value of the brain area corresponding to the name, with respect to each name of the target portion, based on the three-dimensional images for the heads of the plurality of users. For example, the first size threshold value set for the "frontal lobe" may be set based on the average of the size value of the frontal lobe for each of the plurality of users.

Similarly, the reference value of the position of the target portion may be set based on an average of the position values (distance values) of the brain area corresponding to the name, with respect to each name of the target portion, based on the three-dimensional images for the heads of the plurality of users.

As described above, the analyzer (not illustrated) may recognize (identify) a size of the target portion based on the three-dimensional image of the head 1 of the user in consideration of the name of the recognized target portion and the controller 40 may vary a type of the magnetic field generated from the magnetic field generator 30 according to the recognized size of the target portion.

Further, the analyzer (not illustrated) may recognize (identify) a position of the target portion based on the three-dimensional image of the head 1 of the user in consideration of the name of the recognized target portion and the controller 40 may vary a type of the magnetic field generated from the magnetic field generator 30 according to the recognized position of the target portion.

The controller 40 may control the type of the magnetic field generated from the magnetic field generator 30 to vary according to the type of the target portion (that is, at least one of the name, the size, and the position of the target portion).

Further, the controller 40 may control the type of the magnetic field irradiated from the magnetic field generator 30 to vary according to a treatment type for the magnetic field generated from the magnetic field generator 30.

Here, the treatment type may include a first treatment type for activating the cranial nerves corresponding to the target portion and a second treatment type for improving a blood flow of the cerebrovascular blood vessel corresponding to the target portion. Here, the second treatment type may refer to a treatment type to not only improve the blood flow of the cerebrovascular blood vessel, but also enlarge the cerebrovascular blood vessel. That is, the first treatment type may refer to a treatment type for activating the cranial nerves and the second treatment type may refer to a treatment type for improving the blood flow of the cerebrovascular blood vessel and/or enlarging the cerebrovascular blood vessel.

Information about the treatment type may be input, for example, by the user, similarly to the inputting of the information about the name described above.

When the treatment type is the first treatment type, the controller 40 may control the type of the magnetic field generated from the magnetic field generator 30 to a first type. If the treatment type is the second treatment type, the controller 40 may control the type of the magnetic field generated from the magnetic field generator 30 to a second type.

The first type of the magnetic field type for the first treatment type may refer to a type in which a frequency of the magnetic field irradiated from the magnetic field generator 30 is controlled to any one of frequencies lower than 30 Hz. Further, the second type of the magnetic field type for the second treatment type may refer to a type in which a frequency of the magnetic field irradiated from the magnetic field generator 30 is controlled to any one of frequencies of 30 Hz or higher and 1 kHz or lower.

In other words, based on the information about the treatment type input by the user input (that is, the information about the treatment type of the magnetic field by the present apparatus), if the treatment type is a first treatment type, the controller 40 may control the type of the magnetic field to have any one frequency of frequencies lower than 30 Hz, as the first type. Specifically, the controller 40 may control to have any one frequency among frequencies of 1 Hz or higher and lower than 30 Hz, as the first type. Further, if the treatment type is a second treatment type, the controller 40 may control the type of the magnetic field to have any one frequency of frequencies of 30 Hz or higher and 1 kHz or lower as the second type.

The adjuster 50 may adjust the position of the magnetic field generator 30 in consideration of the type of the target portion on which the magnetic field is irradiated. The description of the adjuster 50 may be more easily understood with reference to FIG. 11.

Figure 11:
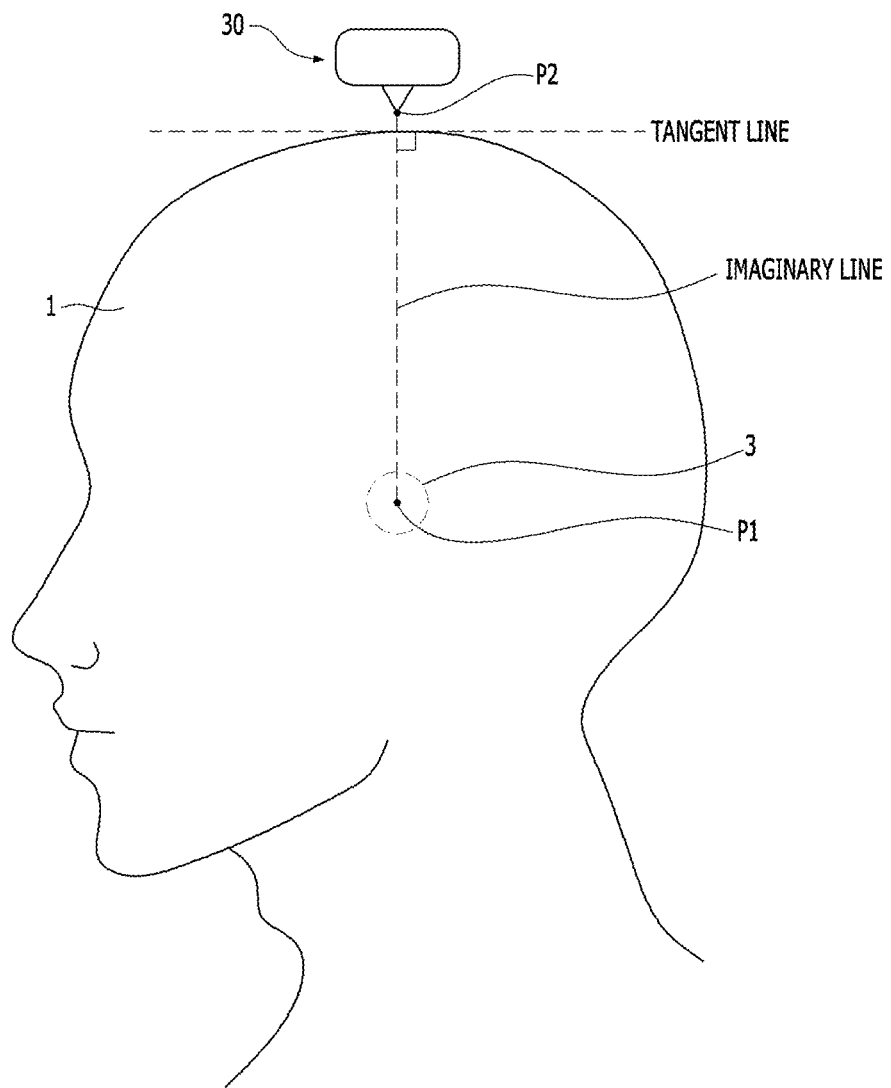
FIG. 11 is a view for explaining an adjuster of a transcranial magnetic stimulation apparatus according to an exemplary embodiment of the present disclosure.

FIG. 11 is a view for explaining an adjuster 50 of a transcranial magnetic stimulation apparatus 10 according to an exemplary embodiment of the present disclosure.

Referring to FIG. 11, the adjuster 50 may adjust the position of the magnetic field generator 30 in the housing unit 20 in consideration of the type of the target portion.

At this time, the adjuster 50 may adjust (move) the position of the magnetic field generator 30 such that an imaginary line extending from the central position P1 of the target portion 3 to the central position P2 of the magnetic field generator 30 is perpendicular to a tangent line of the surface (a body surface) of the head 1 of the user.

That is, the adjuster 50 may adjust the position of the magnetic field generator 30 such that the central position P1 of the magnetic field generator 30 is directed to the central position P1 of the target portion 3 to be located in a direction perpendicular to the tangent line of the surface of the head 1 of the user. By doing this, the present apparatus 10 locates the magnetic field generator 30 to be closer to the target portion 3 to allow the magnetic field irradiated from the magnetic field generator 30 to be focused onto the target portion 3 to perform effective magnetic field stimulation.

As another example, the adjuster 50 may adjust an angle of the magnetic field generator 30 in consideration of the type of the target portion. The adjuster 50 may adjust an angle of the magnetic field generator 30 in the housing unit 20 so that the irradiating direction of the magnetic field irradiated toward the central position P1 of the target portion 3 from the magnetic field generator 30 is perpendicular to the tangent line of the surface (body surface) of the head 1 of the user.

As described above, when the adjuster 50 adjusts the position of the magnetic field generator 30 in consideration of the type of the target portion, the adjuster 50 may adjust the position by moving the magnetic field generator 30 itself or adjust the angle of the magnetic field generator 30 (that is, an irradiating angle of the magnetic field irradiated from the magnetic field generator) while maintaining the position of the magnetic field generator 30.

The present apparatus 10 may include a plurality of magnetic field generators 30. At this time, the controller 40 may individually and/or collectively control the plurality of magnetic field generators. Further, the controller 40 may control differently the types of magnetic fields irradiated from the plurality of magnetic field generators. The description of the example which includes the plurality of magnetic field generators may be more easily understood with reference to FIGS. 12 and 13.

Figure 12:
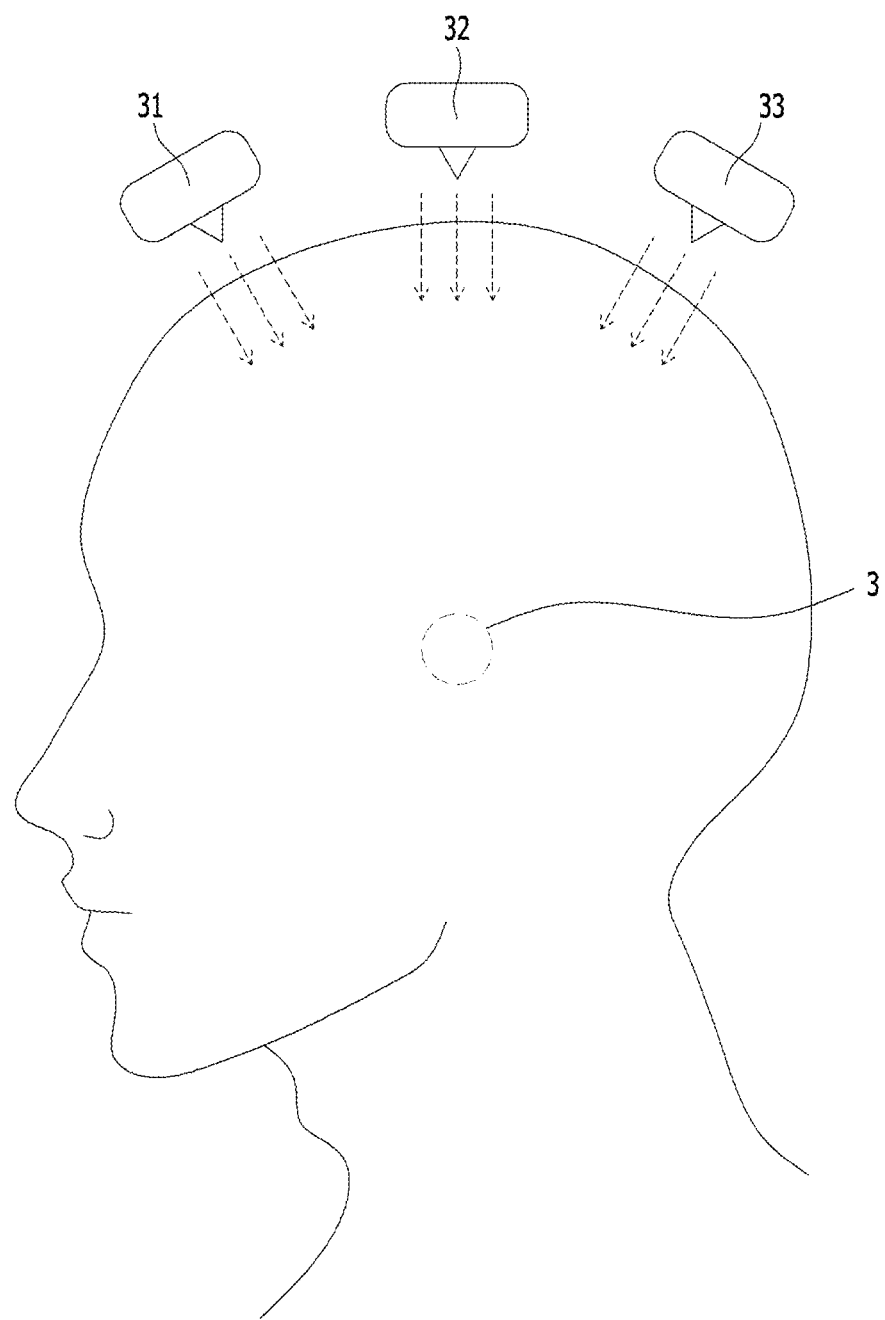
FIGS. 12 and 13 are views illustrating an example that a plurality of magnetic field generators is provided in a transcranial magnetic stimulation apparatus according to an exemplary embodiment of the present disclosure.
Figure 13:
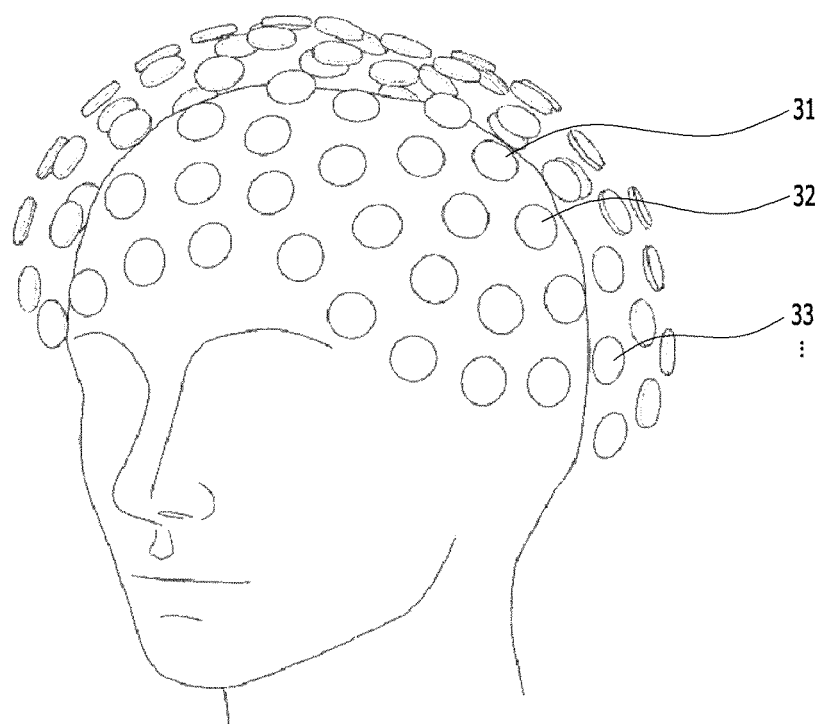

FIGS. 12 and 13 are views illustrating an example that a plurality of magnetic field generators is provided in a transcranial magnetic stimulation apparatus 10 according to an exemplary embodiment of the present disclosure. Specifically, FIG. 12 illustrates an example that the present apparatus 10 includes three magnetic field generators and FIG. 13 illustrates an example that the present apparatus 10 includes twenty or more magnetic field generators.

Referring to FIGS. 12 and 13, the present apparatus 10 may include a plurality of magnetic field generators. That is, the present apparatus 10 may include a plurality of magnetic field generators 31, 32, 33, . . . .

At this time, the plurality of magnetic field generators 31, 32, 33, . . . may be magnetic field generators having the same configuration and function as the above-described magnetic field generator 30. Accordingly, even though the contents are omitted below, the contents described for the magnetic field generator 30 may be applied to the description for each of the plurality of magnetic field generators 31, 32, 33, . . . in the same way.

The controller 40 may individually or collectively control each of the plurality of magnetic field generators 31, 32, 33, . . . . The controller 40 may control the plurality of magnetic field generators 31, 32, 33, . . . to irradiate magnetic fields having different types of magnetic fields.

For example, the controller 40 may control a magnetic field type of the first magnetic field generator 31, among the plurality of magnetic field generators 31, 32, 33, . . . to a first type, control a magnetic field type of the second magnetic field generator 32 to a second type, and control a magnetic field type of the third magnetic field generator 33 to a third type.

Here, for example, the first type may refer to a magnetic field having an intensity (strength) which is relatively stronger than the intensity (strength) of the second type of magnetic field. Further, for example, the second type may refer to a magnetic field having an intensity (strength) which is relatively stronger than the intensity of the third type of magnetic field.

Further, the adjuster 50 may adjust a position of each of the plurality of magnetic field generators 31, 32, 33, . . . in consideration of the type of the target portion.

For example, referring to FIG. 12, the adjuster 50 may adjust a position (or an angle) of each of some magnetic field generators 31, 32, and 33 such that some magnetic field generators 31, 32 and 33 among the plurality of magnetic field generators disposed in different positions irradiate the magnetic field toward the central position P1 of the target portion 3.

The adjuster 50 may individually control the plurality of magnetic field generators 31, 32, 33, . . . and selectively control (select) a position for each of the magnetic field generators 31, 32, 33, . . . .

It is assumed that the controller 40 controls any one of the plurality of magnetic field generators 31, 32, 33, . . . to irradiate a magnetic field. In this case, the magnetic field stimulation on the brain area 2 corresponding to the head 1 of the user may be performed only in a partial area of the brain area 2 corresponding to the magnetic field irradiated from any one of the magnetic field generators, of the entire area of the brain area 2.

That is, the present apparatus 10 selects any one magnetic field generator among the plurality of magnetic field generators 31, 32, 33, . . . and controls the selected magnetic field generator to irradiate the magnetic field so that the magnetic field stimulation may be selectively performed only in a local area as a partial area of the entire area of the brain area 2 of the user.

As another example, it is assumed that the controller 40 controls all the plurality of magnetic field generators 31, 32, 33, . . . to irradiate a magnetic field. In this case, the magnetic field stimulation on the brain area 2 corresponding to the head 1 of the user may be performed on the entire area of the brain area 2 by the magnetic fields irradiated from the plurality of magnetic field generators 31, 32, 33, . . . .

That is, the present apparatus 10 controls the plurality of magnetic field generators 31, 32, 33, . . . to collectively irradiate the magnetic field to perform the magnetic field stimulation on the entire area of the brain area 2 of the user.

A size (range) of the magnetic field stimulated region of the area of the brain area 2 of the user on which the magnetic field stimulation is performed by the present apparatus 10 may be determined according to the number of magnetic field generators which is controlled by the controller 40, among the plurality of magnetic field generators 31, 32, 33, . . . . That is, the larger the number of magnetic field generators controlled by the controller 40, among the plurality of magnetic field generators 31, 32, 33, . . . , the larger the size (that is, a size of the stimulated region of the brain area on which the magnetic field stimulation is performed) of the magnetic field stimulated region of the brain area 2 (that is, the magnetic field stimulation may be performed on a larger area of the brain area).

Further, the size of the magnetic field stimulated region may be determined by a type of the magnetic field generated from at least some magnetic field generators among the plurality of magnetic field generators 31, 32, 33, . . . or a position and/or an angle in the housing unit 20 of at least some magnetic field generators.

Figure 14:
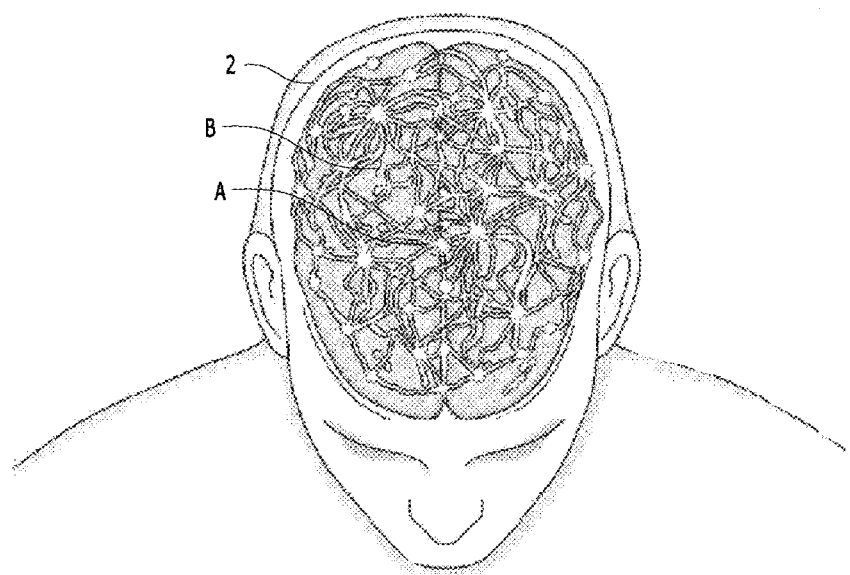
FIG. 14 is a view for explaining a size of a magnetic field-stimulated region of a brain area of a user on which magnetic field stimulation is performed by a transcranial magnetic stimulation apparatus according to an exemplary embodiment of the present disclosure.

FIG. 14 is a view for explaining a size of a magnetic field stimulated region of a brain area of a user on which magnetic field stimulation is performed by a transcranial magnetic stimulation apparatus 10 according to an exemplary embodiment of the present disclosure.

Referring to FIG. 14, for example, it is assumed that the controller 40 controls three magnetic field generators 31, 32, and 33, as some magnetic field generators among the plurality of magnetic field generators as described in the example of FIG. 12, to irradiate the magnetic field toward the target portion 3. In this case, the present apparatus 10 may provide the magnetic field stimulation only on a partial area A (a local area) of the entire area of the brain area 2 corresponding to the head 1 of the user.

As another example, it is assumed that the controller 40 controls all the plurality of magnetic field generators 31, 32, 33, . . . as described in the example of FIG. 13, to irradiate the magnetic field toward the target portion 3. In this case, the present apparatus 10 may provide the magnetic field stimulation on the entire area B of the brain area 2 corresponding to the head 1 of the user.

Figure 15:
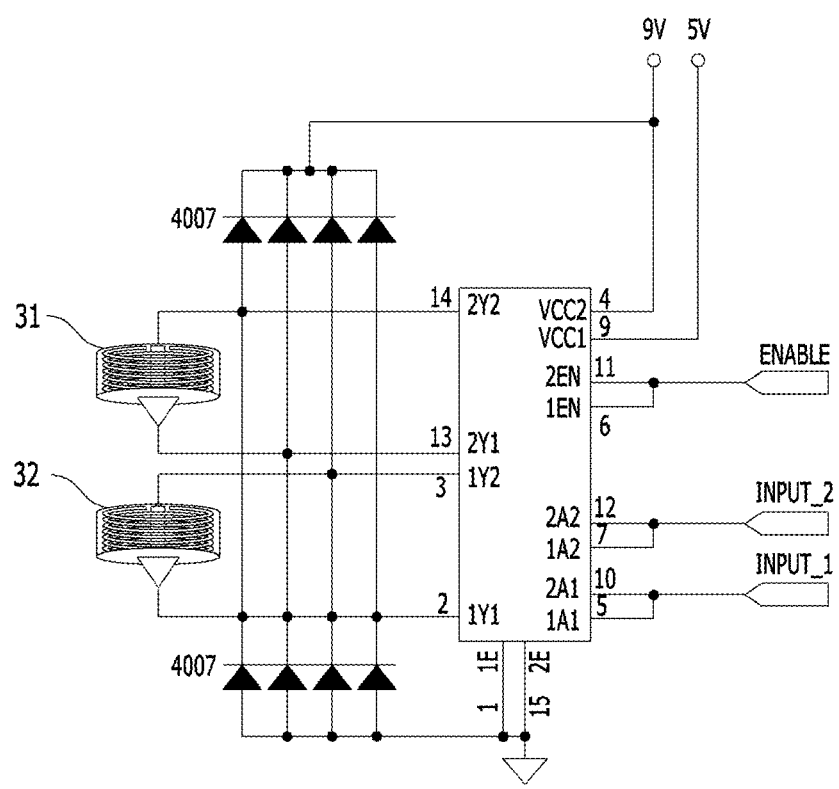
FIG. 15 is a view illustrating a configuration example of a control circuit of a magnetic c field generator of a transcranial magnetic stimulation apparatus according to an exemplary embodiment of the present disclosure.

FIG. 15 is a view illustrating a configuration example of a control circuit of a magnetic field generator of a transcranial magnetic stimulation apparatus 10 according to an exemplary embodiment of the present disclosure. Specifically, FIG. 15 is a view illustrating an example of a control circuit of a magnetic field generator when the present apparatus 10 includes two magnetic field generators as an example.

Referring to FIG. 15, in the present disclosure 10, the controller 40 may include a control circuit for controlling an operation of the magnetic field generator 30. Here, the control circuit of the magnetic field generator may be referred to as a single/bidirectional pulsed magnetic field generation control circuit.

The controller 40 may control the type of the magnetic field generated from the plurality of magnetic field generators 31, 32, 33, . . . included in the present apparatus 10 using the control circuit of the magnetic field generator. Specifically, a type of the magnetic field pulse stimulation may be controlled as a type of the magnetic field.

A type of the magnetic field pulse stimulation may include N-pulse stimulation, S pulse stimulation, alternative stimulation of N pulse and S pulse, N pulse continuous stimulation, and S pulse continuous stimulation as described above.

For example, it is assumed that the present apparatus 10 includes two magnetic field generators 31 and 32. At this time, when a first magnetic field generator 31 between two magnetic field generators generates N pulse stimulation, the controller 40 may control the second magnetic field generator 32 to generate S pulse stimulation.

Further, the controller 40 may control the first magnetic field generator 31 and the second magnetic field generator 32 to alternately generate the S pulse stimulation and the N pulse stimulation according to a predetermined period (for example, 5 seconds).

Even though not illustrated in the drawings, the present apparatus 10 may include a power supply unit (not illustrated). The power supply unit (not illustrated) may supply a power to the present apparatus 10. For example, the power supply unit (not illustrated) may supply a power of DC 48 V or lower, but is not limited thereto.

Figure 16:
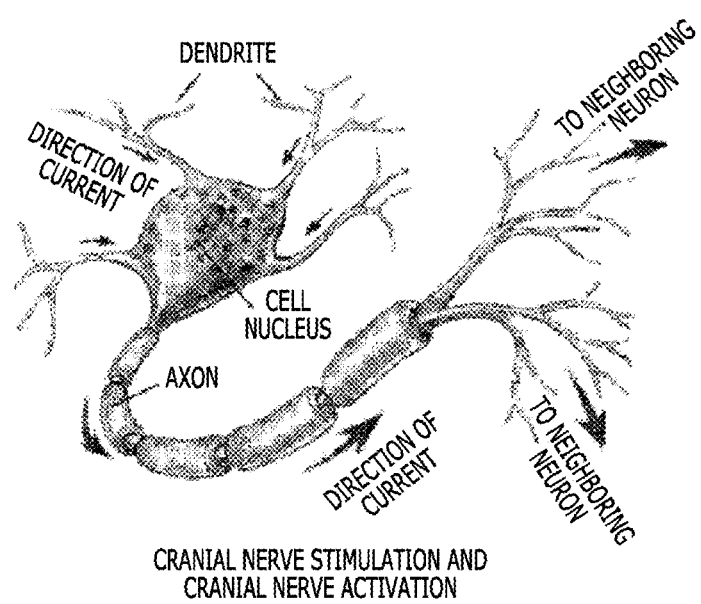
FIG. 16 is a view for explaining a stimulation effect by the magnetic field stimulation by a transcranial magnetic stimulation apparatus according to an exemplary embodiment of the present disclosure.

FIG. 16 is a view for explaining a stimulation effect by the magnetic field stimulation by a transcranial magnetic stimulation apparatus 10 according to an exemplary embodiment of the present disclosure.

Referring to FIG. 16, when the treatment type is a first treatment type, the controller 40 may control a type of the magnetic field irradiated from the magnetic field generator 30 to any one frequency among frequencies lower than 30 Hz, as the first type. Accordingly, the present apparatus 10 irradiates a magnetic field corresponding to any one frequency of frequencies lower than 30 Hz onto the target portion to stimulate the cranial nerves corresponding to the target portion to activate the cranial nerves.

When the treatment type is a second treatment type, the controller 40 may control the type of the magnetic field irradiated from the magnetic field generator 30 to have any one frequency of frequencies of 30 Hz or higher and 1 kHz or lower, as the second type. Accordingly, the present apparatus 10 irradiates a magnetic field corresponding to any one frequency of frequencies of 30 Hz or higher and 1 kHz or lower onto the target portion to not only improve the blood flow of the cerebrovascular blood vessel corresponding to the target portion, but also enlarge the cerebrovascular blood vessel corresponding to the target portion.

That is, the present apparatus 10 irradiates a magnetic field (for example, a micro time varying magnetic field, PEMF) on at least a part of the brain area corresponding to the head 1 of the user using the magnetic field generator 30 to perform the transcranial magnetic stimulation. The present apparatus 10 uses the transcranial magnetic stimulation to stimulate the cranial nerves, enlarge the cerebrovascular blood vessel, and improve the cerebral blood flow. By doing this, the present apparatus 10 may improve the brain diseases of the user.

The present apparatus 10 improves the cerebral blood flow by the transcranial magnetic stimulation using micro time varying magnetic field (PEMF) stimulation to improve various brain diseases such as cerebral infarction, cerebral hemorrhage, dementia, epilepsy, chronic headache, depression, tinnitus, insomnia, ADHD, sleep disorders, and anxiety symptoms accompanying dizziness. That is, the present apparatus 10 may be applicable to improve and treat various brain diseases. In other words, the present apparatus 10 may have users having various brain diseases described above as a treatment application target.

According to the present apparatus 10, the present disclosure may provide a transcranial magnetic stimulation apparatus (stimulator) using a PEMF which is capable of reducing a size and a weight, and is portable.

For example, the present apparatus 10 may irradiate (generate) a magnetic field of 100 mT or lower (1000 Gauss or lower) as a weak magnetic field. Further, the present apparatus 10 may provide pulsed stimulation (which is advantageous to generate an eddy current of a human body and minimize heat generation by applying a PWM method), as a stimulation mode of the magnetic field (a magnetic field pulse stimulation mode). Further, the present apparatus 10 may irradiate a magnetic field having a frequency of 1 kHz or lower from a brainwave range (a frequency range of 1 Hz to lower than 30 Hz) as a stimulation frequency of the magnetic field.

Figure 17:
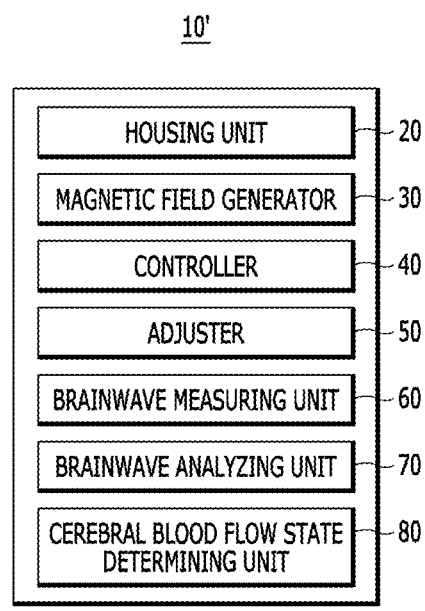
FIG. 17 is a block diagram illustrating a schematic configuration of a transcranial magnetic stimulation apparatus according to another exemplary embodiment of the present disclosure.

FIG. 17 is a block diagram illustrating a schematic configuration of a transcranial magnetic stimulation apparatus 10' according to another exemplary embodiment of the present disclosure.

As compared with the transcranial magnetic stimulation apparatus 10 according to the exemplary embodiment of the present disclosure, the only difference is that the transcranial magnetic stimulation apparatus 10' according to another exemplary embodiment of the present disclosure further includes configurations of a brainwave measuring unit 60, a brainwave analyzing unit 70, and a cerebral blood flow state determining unit 80, but the other configurations are the same. Accordingly, even though the contents are omitted below, the contents described for the transcranial magnetic stimulation apparatus 10 (the present apparatus) according to the exemplary embodiment of the present disclosure may be applied to the description for the transcranial magnetic stimulation apparatus 10' according to another exemplary embodiment of the present disclosure in the same way.

Hereinafter, a transcranial magnetic stimulation apparatus 10' according to another exemplary embodiment of the present disclosure will be simply referred to as the present apparatus 10' for the convenience of description.

Referring to FIG. 17, the present apparatus 10' may include a housing unit 20, a magnetic field generator 30, a controller 40, an adjuster 50, a brainwave measuring unit 60, a brainwave analyzing unit 70, and a cerebral blood flow state determining unit 80. Here, the housing unit 20, the magnetic field generator 30, the controller 40, and the adjuster 50 have been described above in detail, so that a redundant description will be omitted.

The brainwave measuring unit 60 may measure a brainwave of the user using two electrodes disposed in the housing unit 20. The brainwave is also referred to as electroencephalography (EEG).

Specifically, the brainwave measuring unit 60 may measure the change in the brainwave as the magnetic field stimulation is performed on a target portion of the head 1 of the user by the magnetic field generator 30. That is, the magnetic field generator 30 may irradiate a magnetic field on the target portion and the brainwave measuring unit 60 may measure the change in the brainwave of the user by the irradiated magnetic field in response to the magnetic field stimulation.

The brainwave refers to a current generated according to the activity in the brain or a result recorded by deriving and/or amplifying the current. That is, the continuous recording of potential fluctuations between two points on the scalp caused by the electrical activity of the brain is called a brainwave (scalp brainwave). In contrast, a brainwave induced by the cortex of the brain is called a cortical brainwave. Clinically, the scalp brainwave is generally simply referred to as a brainwave. The potential fluctuations are due to the basic properties of the nerve cells which cause a potential difference by physical or chemical fluctuations, like myocardial and skeletal muscles.

As the use of the brainwave, the brainwave is currently widely used as a diagnostic aid in the clinical practice. Specifically, the brainwave is easily used to diagnose brain tumors, head trauma, encephalitis, cerebral hemorrhage, and metabolic disorders, and is particularly useful to diagnose epilepsy. In terms of researches, the brainwave is easily used to clarify the pathophysiology by observing the activity of the brain cells under various conditions. In addition, in order to locally determine intracerebral lesions, phase reversal, left-right asymmetry, brainwave omission, localized abnormal waves, and the like may be utilized as powerful reference materials.

According to this, the brainwave measuring unit 60 uses two electrodes to measure the potential fluctuations between two electrodes as a brainwave.

In the present apparatus 10', two electrodes used to measure the brainwave may be disposed with a predetermined interval therebetween on an inner surface of the housing unit 20.

At this time, in the present apparatus 10', the sharp portion 33a of the magnetic field generator 30 is provided in the housing unit 20 to be exposed from the inner surface of the housing unit 20 so that a space corresponding to an interval corresponding to a height of the sharp portion 33a exposed from the inner surface of the housing unit 20 may be formed between the head (specifically, the scalp) of the user and the inner surface of the housing unit 20. When two electrodes are provided in one area on the inner surface of the housing unit 20, two electrodes are disposed so as not to be in contact with the head (specifically, the scalp) of the user due to the space so that the brainwave may not be accurately measured.

Accordingly, a protrusion (not illustrated) may be provided in one region on the inner surface of the housing unit 20 of the present apparatus 10'. At this time, a protruding height of the protrusion (not illustrated) is a height of the protrusion protruding from the inner surface of the housing unit 20 and may be set to a height corresponding to a height of the sharp portion 30a which is exposed (protrudes) from the inner surface of the housing unit 20.

The protrusion (not illustrated) may be provided as many as the number of electrodes provided in the present apparatus 10'. That is, two protrusions (not illustrated) may be provided on the inner surface of the housing unit 20. At this time, two electrodes may be provided on one surface of two protrusions (not illustrated). According to this, when the user wears the present apparatus 10' on the head, two electrodes provided on one surface of two protrusions (not illustrated) may be in contact with the scalp of the head 1 of the user.

The brainwave analyzing unit 70 may determine the brain state of the user by analyzing the brainwave (a brainwave responding to the magnetic field stimulation, a changed brainwave) measured by the brainwave measuring unit 60. The brain analyzing unit 70 may identify a type of the brainwave by analyzing the measured brainwave and determine the brain state (a state of the brain) f the user corresponding to the identified type of brainwave.

When the brainwave is analyzed, the type of the brainwave may be classified according to a frequency and an amplitude of the measured brainwave. Generally, the alpha wave (α) can be said to be a representative component of the brainwave of the human and a graph of the alpha wave generally continuously appears as a regular wave around 10 Hz. An amplitude of the brainwave appears to be approximately 50 μV on average and is the largest in the parietal part and the occipital part of the head 1 of the user and is small in the frontal part.

Figure 18:
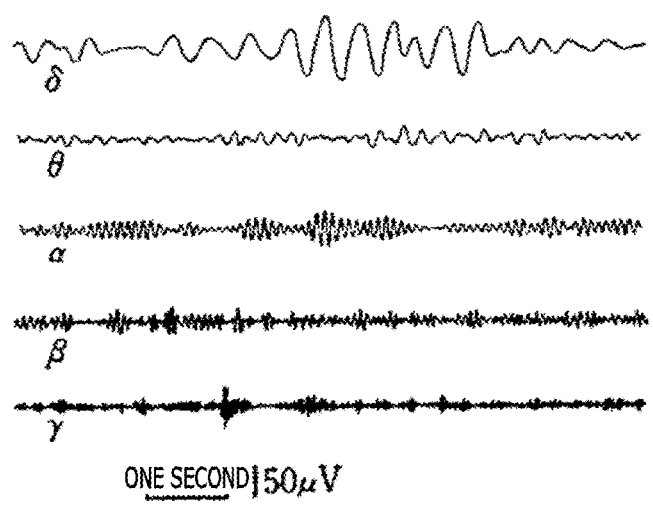
FIG. 18 is a view for explaining a type of a brainwave measured by a transcranial magnetic stimulation apparatus according to another exemplary embodiment of the present disclosure.

FIG. 18 is a view for explaining a type of a brainwave measured by a transcranial magnetic stimulation apparatus 10 according to another exemplary embodiment of the present disclosure. FIG. 19 is a view for explaining a brain state according to a type of a brainwave measured by a transcranial magnetic stimulation apparatus 10 according to another exemplary embodiment of the present disclosure.

Referring to FIGS. 18 and 19, types of the brainwave measured by the brainwave measuring unit 60 may include a delta (δ) wave, a theta (θ) wave, an alpha (α) wave, a beta (β) wave, and a gamma (γ) wave. However, it is not limited thereto so that the type of the brainwave may include an SMR wave, a high beta wave, and the like.

When a frequency of the brainwave measured by the brainwave measuring unit 60 is 1 Hz or higher and lower than 4 Hz, the brainwave analyzing unit 70 may identify the type of the brainwave as a delta wave and determine the brain state corresponding to the identified type of the brainwave as a sound sleep state.

Similarly, when a frequency of the measured brainwave is 4 Hz or higher and lower than 8 Hz, the type of the brainwave may be identified as a theta wave and the brain state may be determined as sleepy, delusional, distracted, or daydreaming states. When a frequency of the measured brainwave is 8 Hz or higher and lower than 12 Hz, the type of the brainwave may be identified as an alpha wave and the brain state may be determined as loose concentration and a dazed mental state. When a frequency of the measured brainwave is 12 Hz or higher and lower than 15 Hz, the type of the brainwave may be identified as an SMR wave and the brain state may be determined as a state of maintaining concentration during the state of immobility.

When a frequency of the measured brainwave is 15 Hz or higher and lower than 18 Hz, the type of the brainwave may be identified as a beta wave and the brain state may be determined as a state of maintaining concentration during the active state. When a frequency of the measured brainwave is 18 Hz or higher and lower than 30 Hz, the type of the brainwave may be identified as a high beta wave and the brain state may be determined as an uncomfortable state, an anxious state, or a stressful state. When a frequency of the measured brainwave is 30 Hz or higher, the type of the brainwave is identified as a gamma wave and the brain state may be determined as an excited state, an anxious state, or a momentarily aware state.

Further, the type of the brainwave may include an abnormal wave (abnormal brainwave). The abnormal wave refers to a brainwave having an abnormal amplitude, an abnormal waveform, or an abnormal frequency. The abnormal wave has an amplitude which is 150 μV or higher or extremely low. As an abnormal waveform, (a spikes stimulation wave) are representative. The brainwave having an abnormal frequency is a slow wave group (mainly, δ wave and θ wave) and a fast wave group. Actually, the most important brainwave is the spikes which are almost common to epilepsy.

In other words, the brainwave may include a normal brainwave which appears in a normal person and an abnormal wave (abnormal brainwave) seen in pathological conditions. In a sense, anything other than the normal brainwave may be called abnormal waves. However, the normal brainwaves have individual differences and diverse enough to be compared with fingerprints so that the abnormal waves also diverse. However, the abnormal waves may be generally defined as follows.

Abnormality in the waveform has spikes having a sharp leading edge with a fast period, spikes-slow wave complex having a high amplitude in which the 0 wave or the 8 wave is repeated, a sharp wave which has a sharp leading edge of the wave, but has a period belonging to the α wave or lower, and a sharp wave-slow wave complex in which the slow wave appears, which are specific to various epilepsies.

An example of the abnormality in the frequency and the amplitude is slow waves. In a normal person, a wave slower than the α wave appears rare. If the α wave appears or the θ wave repeatedly appears during the stable awakening state, it can be said to be an abnormal wave. The δ wave is seen in brain tumors or cerebrovascular disorders. Further, when the frequency of the β wave has a wave around 8 Hz as a main wave, it can also be said to be an abnormal wave and in this case, the brain function deteriorates. If the β wave occupies 3% or more of the entire brainwave, it can also be said to be an abnormal wave. Further, a brainwave having abnormally high amplitude or low amplitude may also be determined as an abnormal wave.

The brainwave analyzing unit 70 may determine whether the measured brainwave is an abnormal wave (abnormal brainwave) by analyzing the brainwave measured by the brainwave measuring unit 60. If the measured brainwave is determined as an abnormal wave as the determination result, the controller 40 may control a type of the magnetic field generated from the magnetic field generator 30 to be changed from the first type to the second type.

Further, if the measured brainwave is determined as an abnormal wave, the controller 40 may display a notice informing that the abnormal wave is detected (measured) on a display unit (not illustrated) provided in an area of an outer surface of the housing unit 20. Alternatively, if the measured brainwave is determined as an abnormal wave, the controller 40 may generate a notice (a sound notice) informing that the abnormal wave is detected (measured) through a speaker (not illustrated) provided in an area of an outer surface of the housing unit 20.

In the meantime, the brainwave analyzing unit 70 may determine the brain state of the user by analyzing the graph of the brainwave (a brainwave responding to the magnetic field stimulation, a changed brainwave) measured by the brainwave measuring unit 60. The graph of the brainwave measured by the brainwave measuring unit 60 may include a resistance according to the elapse of time and information about the level of the brain state. Here, the level of the brain state refers to a degree of an arousal state, a degree of an excited state, a degree of a tension state, and the like. In the graph of the brainwave, the types of brainwaves may be represented with different colors.

According to this, the brainwave analyzing unit 70 may determine (discern) the degree (level) of the brain state by analyzing the graph of the measured brainwave.

The controller 40 may control the type of the magnetic field irradiated from the magnetic field generator 30 to vary according to the type of the brainwave which is identified by analyzing the measured brainwave. In other words, the controller 40 may control the type of magnetic field to vary according to the frequency of the measured brainwave.

For example, when the identified type of the brainwave is a delta wave (when the frequency of the brainwave is 1 Hz or higher and lower than 4 Hz), the controller 40 may control the type of magnetic field to be a first type and when the identified type of the brainwave is a theta wave (when the frequency of the brainwave is 4 Hz or higher and lower than 8 Hz), the controller 40 may control the type of magnetic field to be a second type. Here, examples of the first type and the second type have been described above, so that the description will be omitted below.

The cerebral blood flow state determining unit 80 may determine at least one of a cerebral blood flow rate, a cerebral blood flow amount, and an atherogenic index of a cerebral vessel as the cerebral flood flow state of the user. For example, the cerebral blood flow state determining unit 80 may determine the cerebral blood flow state using transcranial Doppler (TCD) measurement. To this end, the present apparatus 10' may include a Doppler ultrasonic sensor (not illustrated) for the transcranial Doppler measurement.

The cerebral blood flow state determining unit 80 may determine the cerebral blood flow state by analyzing the cerebral blood flow state information acquired using the Doppler ultrasonic sensor (not illustrated). To this end, the Doppler ultrasonic sensor (not illustrated) may be disposed in an area of the inner surface of the housing unit 20.

As another example, the cerebral blood flow state determining unit 80 may acquire the cerebral blood flow state information of the user from separate equipment (for example, a cerebral blood flow ultrasonic measurement device) which is capable of measuring the transcranial Doppler via a network and analyze the acquired cerebral blood flow state information to determine the cerebral blood flow state of the user. Here, the example of the network has been described in detail above, so that a redundant description will be omitted below.

The controller 40 may control the type of magnetic field irradiated from the magnetic field generator 30 to vary according to the cerebral blood flow state (a cerebral blood flow rate, a cerebral blood flow amount, and an atherogenic index of a cerebral vessel) determined by the cerebral blood flow state determining unit 80.

Specifically, the controller 40 may control the type of the magnetic field to vary according to whether the cerebral blood flow rate determined as the cerebral blood flow state is a first threshold rate or higher. At this time, when the cerebral blood flow rate is a first threshold rate or higher, the controller 40 may control the type of the magnetic field to a first type and when the cerebral blood flow rate is lower than the first threshold rate, may control the type of the magnetic field to a second type. Here, the first type may refer to a magnetic field having an intensity (strength) which is relatively stronger than the intensity (strength) of a second type of magnetic field.

Further, the controller 40 may control the type of the magnetic field to vary according to whether the cerebral blood flow amount determined as the cerebral blood flow state is a first threshold blood flow amount or larger. For example, when the cerebral blood flow amount is a first threshold blood flow amount or larger, the controller 40 may control the type of the magnetic field to a first type and when the cerebral blood flow amount is smaller than the first threshold blood flow amount, may control the type of the magnetic field to a second type.

Similarly, the controller 40 may control the type of the magnetic field to vary according to whether the atherogenic index of a cerebral vessel determined as the cerebral blood flow state is a first threshold atherogenic index or higher. For example, when the atherogenic index of a cerebral vessel is a first threshold atherogenic index or higher, the controller 40 may control the type of the magnetic field to a first type and when the atherogenic index of a cerebral vessel is lower than the first threshold atherogenic index, may control the type of the magnetic field to a second type.

As described above, the controller 40 may control to change or adjust the type of the magnetic field generated from the magnetic field generator 30 in consideration of the analysis result (that is, the identified type of brainwave or determined brain state information) by the brainwave analyzing unit 70 and the determination result (that is, the cerebral blood flow state determining result) by the cerebral blood flow state determining unit 80.

The present apparatus 10, 10' is provided to be wearable on the head of the user and may include at least one magnetic field generator. The present apparatus 10, 10' may selectively control a position and/or operation of at least one magnetic field generator.

The transcranial stimulation devices of the related art are transcranial magnetic field stimulators mainly using a high power magnetic field so that there are problems in that a stimulation range is wide and it is difficult to locally stimulate a specific range, and it is difficult to select a selective location, and perform stimulation in various ways. In contrast, the present apparatus 10, 10' may perform local stimulation, selectively control (adjust) a position of the magnetic field generator, and provide various types of stimulations.

The present apparatus 10, 10' uses a weak pulsed magnetic field to be applicable to improve the cerebral blood flow, stimulate the cerebrovascular blood vessel, and activate the brain cells for personal uses in various fields. Further, the present apparatus 10, 10' may be easily applied to learning including dementia, depression, and brain diseases and brainwave stimulation.

Hereinafter, an operation flow of the present disclosure will be described in brief based on the above-detailed description.

FIG. 20 is a flowchart of an operation of a control method of a transcranial magnetic stimulation apparatus according to an exemplary embodiment of the present disclosure.

The control method of a transcranial magnetic stimulation apparatus illustrated in FIG. 20 may be performed by the present apparatus 10, 10' described above. Therefore, even though some contents are omitted below, the contents which have been described for the present apparatus 10, 10' may be applied to the description for the control method of a transcranial magnetic stimulation apparatus in the same way.

Referring to FIG. 20, in step S11, the controller may control an operation of a magnetic field generator provided in the housing unit which is provided to be wearable on the head of the user.

At this time, in step S11, the controller may control the type of the magnetic field generated from the magnetic field generator to vary according to a type of a target portion of the brain area on which the magnetic field is irradiated.

Here, the type of the target portion may include at least one of a name, a size, and a position of the brain in which the magnetic field is irradiated.

Further, in step S11, the controller may control at least one of an intensity, a frequency, a time, a pattern of the magnetic field, and a pulse stimulation mode of the magnetic field as a type of magnetic field generated from the magnetic field generator.

Further, in step S11, the controller may control the type of the magnetic field to vary according to the treatment type of the magnetic field irradiated from the magnetic field generator. Here, the treatment type may include a first treatment type for activating the cranial nerves corresponding to the target portion and a second treatment type for improving a blood flow of the cerebrovascular blood vessel corresponding to the target portion.

Further, in step S11, if the treatment type is a first treatment type, the controller may control the type of the magnetic field to have any one frequency of frequencies which are lower than 30 Hz as the first type. Further, if the treatment type is a second treatment type, the controller may control the type of the magnetic field to have any one frequency of frequencies which are equal to or higher than 30 Hz and equal to or lower than 1 kHz as the second type.

Further, in step S11, when the present apparatus 10, 10' includes a plurality of magnetic field generators, the controller may individually and/or collectively control each of the plurality of magnetic field generators.

Next, in step S12, the magnetic field generator may irradiate the magnetic field toward the target portion which is a target to be irradiated with magnetic field, of the brain area corresponding to the head of the user, in accordance with the control in step S11.

At this time, in step S12, the magnetic field generator may irradiate a pulsed electro-magnetic field (PEMF).

Further, in step S12, the magnetic field generator may include two coil guides which are located to be opposite each other, a magnetic body located between two coil guides to be perpendicular to each of the two coil guides, and a coil wound around the magnetic body. Here, the magnetic body may include a sharp portion which is formed to protrude from an outer surface of any one of the two coil guides to apply acupressure to the head of the user corresponding to a target portion.

According to this, in step S12, the magnetic field generator may provide magnetic field stimulation on the head of the user by irradiating the magnetic field and also provide acupressure stimulation on the head of the user by means of the sharp portion. That is, in step S12, the present apparatus 10, 10' may simultaneously provide magnetic field stimulation and acupressure stimulation.

Further, even though not illustrated in the drawings, before the step S12, the control method of a transcranial magnetic stimulation apparatus according to the exemplary embodiment of the present disclosure may include a step (hereinafter, referred to as step S13 for the convenience of description) of adjusting a position of the magnetic field generator in consideration of a type of the target portion to which the magnetic field is irradiated, by the adjuster.

At this time, in step S13, the adjuster may adjust the position of the magnetic field generator such that an imaginary line extending from a central position of the target portion to a central position of the magnetic field generator is perpendicular to a tangent line of the surface of the head of the user.

Next, in step S12, the magnetic field generator may irradiate the magnetic field based on the adjusted position.

In the above description, steps S11 and S12 may be further divided into additional steps or combined as smaller steps depending on an implementation embodiment of the present disclosure. Further, some steps may be omitted if necessary and the order of steps may be changed.

The control method for a transcranial magnetic stimulation apparatus according to the exemplary embodiment of the present invention may be implemented as a program command which may be executed by various computers to be recorded in a computer readable medium. The computer readable medium may include solely a program command, a data file, and a data structure or a combination thereof. The program command recorded in the medium may be specifically designed or constructed for the present disclosure or known to those skilled in the art of a computer software to be used. An example of the computer readable recording medium includes magnetic media, such as a hard disk, a floppy disk, and a magnetic tape, optical media, such as a CD-ROM and a DVD, magneto-optical media, such as a floptical disk, and a hardware device, such as a ROM, a RAM, a flash memory, specially formed to store and execute a program command. Examples of the program command include not only a machine language code which is created by a compiler but also a high level language code which may be executed by a computer using an interpreter. The hardware device may operate as one or more software modules in order to perform the operation of the present disclosure and vice versa.

Further, the above-described control method for a transcranial magnetic stimulation apparatus may also be implemented as a computer program or an application executed by a computer which is stored in a recording medium.

The above description of the present disclosure is illustrative only and it is understood by those skilled in the art that the present disclosure may be easily modified to another specific type without changing the technical spirit or an essential feature of the present disclosure. Thus, it is to be appreciated that the embodiments described above are intended to be illustrative in every sense, and not restrictive. For example, each component which is described as singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A transcranial magnetic stimulation apparatus, comprising:
   a housing unit provided to be capable of being wearable on a head of a user;
   a magnetic field generator provided in the housing unit, the magnetic field generator being configured to generate and irradiate a magnetic field toward a target portion of a brain area corresponding to the head of the user, the target portion being a target to be irradiated with the magnetic field; and
   a controller configured to control an operation of the magnetic field generator,
   wherein the magnetic field generator includes:
      two coil guides located to be opposite to each other;
      a magnetic body located between the two coil guides to be perpendicular to the two coil guides; and
      a coil wound around the magnetic body, and
   wherein the magnetic body includes a sharp portion which is formed to protrude from an outer surface of any one of two coil guides to apply acupressure to the head of the user corresponding to the target portion.

2. The transcranial magnetic stimulation apparatus according to claim 1, wherein the controller is configured to control a type of magnetic field generated from the magnetic field generator to vary according to a type of the target portion of the brain area.

3. The transcranial magnetic stimulation apparatus according to claim 2, wherein the type of the target portion includes at least one of a name, a size, and a position of a part of the brain.

4. The transcranial magnetic stimulation apparatus according to claim 3, further comprising:
an adjuster configured to adjust a position of the magnetic field generator in consideration of the type of the target portion,
wherein the adjuster configured to adjust the position of the magnetic field generator such that an imaginary line extending from a central position of the target portion to a central position of the magnetic field generator is perpendicular to a tangent line of a surface of the head of the user.

5. The transcranial magnetic stimulation apparatus according to claim 2, wherein the controller is configured to control at least one of an intensity, a frequency, a time, and a pattern of the magnetic field and a magnetic field pulse stimulation mode as the type of magnetic field.

6. The transcranial magnetic stimulation apparatus according to claim 5, wherein the controller is configured to control the type of the magnetic field to vary according to a treatment type of the magnetic field and the treatment type includes a first treatment type for activating cranial nerves corresponding to the target portion and a second treatment type for improving a blood flow of a cerebrovascular blood vessel corresponding to the target portion.

7. The transcranial magnetic stimulation apparatus according to claim 6, wherein when the treatment type is the first treatment type, the controller is configured to control the type of the magnetic field to have any one frequency among frequencies lower than 30 Hz as a first type, and
wherein when the treatment type is the second type, the controller is configured to control the type of the magnetic field to have any one frequency among frequencies of 30 Hz or higher and 1 kHz or lower as a second type.

8. The transcranial magnetic stimulation apparatus according to claim 1, wherein the magnetic field generator includes a plurality of magnetic field generators and the controller is configured to individually and/or collectively control the plurality of magnetic field generators.

9. The transcranial magnetic stimulation apparatus according to claim 1, wherein the magnetic field includes a pulsed electro-magnetic field (PEMF).

* * * * *